United States Patent

[11] 3,620,983

| [72] | Inventors | Daniel Porret<br>Rinningen;<br>Hans Batzer, Arlesheim; Rolf Schmid, Reinach; Peter Ruf, Binningen, all of Switzerland |
|---|---|---|
| [21] | Appl. No. | 876,137 |
| [22] | Filed | Nov. 12, 1969 |
| [73] | Assignee | Ciba Limited<br>Basel, Switzerland |
| [32] | Priority | Nov. 21, 1968 |
| [33] | | Switzerland |
| [31] | | 17352/68 |

[54] β-METHYLGLYCIDYL-ISOCYANURATES
3 Claims, No Drawings

[52] U.S. Cl............................................. 260/2 EP,
260/77.5 NC, 260/78.4 ER, 260/248 NS
[51] Int. Cl............................................. C08q 30/02,
C08q 30/10
[50] Field of Search........................................ 260/248 A,
248 NS, 2 EP, 77.5 NC, 78.4 EP

[56] References Cited
UNITED STATES PATENTS
2,809,942 10/1957 Cooke.......................... 260/2

2,931,781 4/1960 Hofmann et al............. 260/2
3,337,509 8/1967 Budnowski................. 260/77.5

Primary Examiner—William H. Short
Assistant Examiner—E. A. Nielsen
Attorneys—Harry Goldsmith, Joseph G. Kolodny and Mario A. Monaco ABSTRACT: The new compound tri-(β-methylglycidyl)-isocyanurate is manufactured by a reaction, which is in itself known, of cyanuric acid with β-methylepichlorhydrin in the presence of tertiary amines or quaternary ammonium salts, and subsequent dehydrohalogenation with alkali. In comparison with the known tri-(glycidyl)-isocyanurate, tri-(β-methyglycidyl)-isocyanurate can be more easily processed, on the one hand because of the lower melting point and on the other hand because of the lesser reactivity. Apart from compression moulding compositions, the material is therefore also excellently suited to being used as a casting resin. Suitable curing agents are above all polysebacic anhydride, and also aliphatic polyamines. Using the latter, it is surprisingly possible to manufacture a stable B-stage which is for example suitable for the manufacture of compression moulding compositions.

β-METHYLGLYCIDYL-ISOCYANURATES

The manufacture of triglycidyl-isocyanurate by reaction of epichlorhydrin with cyanuric acid is known.

Triglycidyl-isocyanurate is an industrially valuable epoxide resin which on curing with customary curing agents, above all anhydride curing agents, yields cross-linked mouldings having good mechanical, thermal and electrical properties, above all excellent tracking resistance and a high heat distortion point.

At the same time, however, triglycidyl-isocyanurate exhibits a series of serious disadvantages, above all in processing technique, when used as a curable epoxide resin. The high reactivity on the one hand, and the relatively high melting point of triglycidyl-isocyanurate on the other, demand high processing temperatures and at the same time extremely short processing times. For this reason curable mixtures based on triglycidyl-isocyanurate have in practice hitherto almost exclusively been employed in the compression moulding composition field. By contrast, use of such mixtures as a casting resin, above all in rather thick layers or for the manufacture of rather large castings, is as a rule impossible in practice, because the high reactivity leads to an intense exothermic effect and to the formation of cracks and cavities connected therewith. Because of the too violently occurring exothermic reaction the use of various classes of reactive curing agents, especially aliphatic amines, together with triglycidyl-isocyanurate is also technically impossible to carry out.

The manufacture of castings with a high content of inorganic fillers is additionally rendered difficult or impossible by the high viscosity of the melts of triglycidyl-isocyanurate and curing agents.

It has now proved possible to manufacture new epoxide resins from cyanuric acid, which on curing yield mouldings having the same good properties as those based on triglycidyl-isocyanurate without possessing its disadvantages in processing.

It has now been found that tri-(β-methylglycidyl)-isocyanurate can be easily manufactured by reaction of β-methylepichlorhydrin with cyanuric acid. This compound not only shows a lower melting point but also a significantly lower reactivity than triglycidyl-isocyanurate so that the processing time with curing agents can be increased by a multiple. Mixtures of tri-(β-methylglycidyl)-isocyanurate and curing agents for epoxide resins can therefore easily be employed as casting resins, also because the melting point of tri-(β-methylglycidyl)-isocyanurate is lower than that of triglycidyl-isocyanurate. Using anhydride curing agents, epoxide resin/curing agent mixtures of low viscosity are obtained, so that large castings with a high filler content can easily be cast. The mouldings thus obtained are as a rule further distinguished by increased flexibility relative to the mouldings based on triglycidyl-isocyanurate. Tri-(β-methylglycidyl)-isocyanurate can furthermore also be cured with aliphatic polyamines to give bubble-free mouldings.

Thus a much broader range of technical applications is available for tri-(β-methylglycidyl)-isocyanurate than for triglycidyl-isocyanurate: all known curing methods and processing methods which are known for customary epoxide resins can be employed. The electrical, mechanical and thermal properties of the cured mouldings manufactured from tri-(β-methylglycidyl)-isocyanurate are excellent.

The above-mentioned advantages can also be achieved, to a somewhat lesser extent, if only a part of the glycidyl groups of the triglycidyl-isocyanurate is replaced by β-methylglycidyl groups. Such products can be manufactured by reaction of cyanuric acid with a mixture of epichlorhydrin and β-methylepichlorhydrin.

The subject of the present invention are thus new β-methylglycidyl-isocyanurates of formula

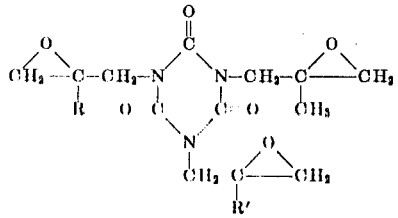

(I)

wherein R and R' each represent a hydrogen atom or a methyl group.

The β-methylglycidyl-isocyanurates of formula (I) can be manufactured according to the invention by dehydrohalogenating the residues X, $X_1$ and $X_2$, with the formation of a 1,2-epoxide group, in a compound of formula

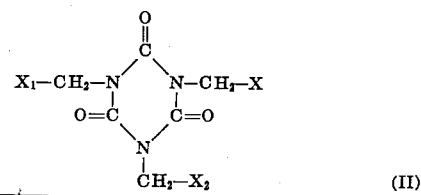

(II)

wherein X denotes a 1-methyl-1- or -2-hydroxy-2- or -1-halogen-ethyl residue and $X_1$ and $X_2$ each denote a 1-methyl-1- or -2-hydroxy-2- or -1-halogen-ethyl residue or a 1- or 2-hydroxy-2- or -1-halogenethyl residue.

A possible 1-methyl-hydroxy-halogen-ethyl residue or hydroxy-halogen-ethyl residue is above all the 1-methyl-1-hydroxy-2-halogenethyl or 1-hydroxy-2-halogenethyl residue.

Halogen atoms are here especially chlorine or bromine atoms. The reaction is carried out in the usual manner, above all in the presence of agents which split off hydrogen halide, such as strong alkalis, for example anhydrous sodium hydroxide or aqueous sodium hydroxide solution. At the same time it is however also possible to use other strongly alkaline reagents, such as potassium hydroxide, barium hydroxide, calcium hydroxide, sodium carbonate or potassium carbonate.

The starting substances of formula (II) are obtained in a manner which is in itself known. Thus for example 1 mol of cyanuric acid can be reacted with at least 3 mols of a β-methyl-epihalogenohydrin or a mixture of β-methyl-epihalogenohydrin and epihalogenohydrin.

Preferably, cyanuric acid is reacted with a β-methyl-epihalogenohydrin, such as β-methyl-epibromhydrin or above all β-methyl-epichlorhydrin, in the presence of a catalyst, such as especially a tertiary amine, a quaternary ammonium base or a quaternary ammonium salt. Suitable catalysts for the addition of β-methyl-epichlorhydrin or of a mixture of β-methyl-epichlorhydrin and epichlorhydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate, and methyltriethylammonium chloride; hydrazines possessing a tertiary nitrogen atom, such as 1,1-dimethylhydrazine, which can also be employed in a quaternized form; alkali halides, such as lithium chloride, potassium chloride, sodium chloride, bromide or fluoride; further, ion exchange resins possessing tertiary or quaternary amino groups, and also ion exchangers possessing acid amide groups. Basic impurities which can occur in commercially available forms of cyanuric acid can also serve as catalysts. In such cases it is not necessary to add a special catalyst.

The invention also relates to those embodiments of the process in which a starting substance is formed under the reaction conditions and is further processed without isolation.

A preferred embodiment of the process for example consists of reacting at least 3 mols of β-methyl-epihalogenohydrin, preferably β-methyl-epichlorhydrin, with 1 mol of cyanuric acid in the presence of a catalyst, such as preferably a tertiary amine, a quaternary ammonium base or a quaternary ammonium salt, and in a second stage converting the resulting product containing halogenohydrin groups into tri-(β-methylglycidyl)-isocyanurate by treatment with agents which split off hydrogen halide, such as, especially, strong alkalis.

In these reactions the procedure described above is followed, and the above-mentioned compounds can be used as catalysts for the addition of β-methyl-epihalogenohydrin and for the dehydrohalogenation. Here particularly good yields are obtained if a stoichiometric excess of β-methyl-epichlorhydrin is used. During the first reaction, before the addition of alkali, a partial epoxidation of the β-methyl-chlorhydrin of the isocyanuric acid already occurs. The β-methyl-epichlorhydrin, which acts as a hydrogen chloride acceptor, is then partially converted into β-methyl-glycerinedichlorhydrin.

The addition of the β-methyl-epihalogenohydrin to the cyanuric acid can here be carried out according to known processes, with or without solvents, with a lesser or greater excess of β-methyl-epichlorhydrin, at temperatures of up to 140° C., under the catalytic action of tertiary amines, quaternary ammonium salts, alkali halides and other anionically acting catalysts, in 30 to 360 minutes. The subsequent dehydrohalogenation can take place at 40° to 70° C. with solid or liquid alkalis and optionally with the resulting water being distilled off azeotropically. The alkali halide is separated off according to known processes. The resulting tri-(β-methyl-glycidyl)-isocyanurate is isolated by distilling off the excess β-methyl-epichlorhydrin and the solvent which may have been used. The resulting crude product can, if desired, be purified according to known methods, such as for example recrystallization from solvents such as for example methanol, ethanol or isopropanol, whereby a white, crystalline product with an almost theoretical epoxide content can be isolated.

As mentioned initially, the new β-methylglycidyl-isocyanurates of formula (I) react with the customary curing agents for polyepoxide compounds. They can therefore be cross-linked or cured by the addition of such curing agents, analogously to other polyfunctional epoxide compounds. Possible curing agents of this kind are basic or acid compounds.

As suitable curing agents the following may above all be mentioned: aliphatic, cycloaliphatic or aromatic polyamines, for example ethylenediamine, hexamethylenediamine, trimethylhexamethylenediamine, diethylenetriamine, triethylenetetramine, tetraethylenepentamine, N,N-dimethyl-propylenediamine-1,3, N,N,-diethylpropylenediamine-1,3, 2,2-bis-(4'-aminocyclohexyl)-propane, 3,5,5-trimethyl-3-(aminomethyl)-cyclohexylamine ("isophorone-diamine"), meta-phenylenediamine, p-phenylenediamine, bis-(4-aminophenyl)-methane, bis-(4-aminophenyl)-sulphone, and m-xylylenediamine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine, in excess and polyepoxides such as diomethane-polyglycidyl-ethers; ketimines, for example from acetone or methyl ethyl ketone and bis-(p-aminophenyl)-methane; adducts from monophenols or polyphenols and polyamines; polyamides, especially those from aliphatic polyamines, such as diethylenetriamine or triethylenetetramine, and dimerized or trimerized unsaturated fatty acids, such as dimerized linseed oil fatty acid ("VERSAMID"); further, polybasic carboxylic acids and their anhydrides, and in particular, above all, polysebacic anhydride.

When curing with an anhydride, accelerators, for example 2-ethyl-4-methyl-imidazole or especially 1-methyl-imidazole can optionally be conjointly used.

The term "cure" as used here denotes the conversion of the above β-methylglycidyl-isocyanurates into insoluble and infusible, cross linked products, and in particular as a rule with simultaneous shaping to give mouldings, such as castings, pressings or laminates or to give two-dimensional structures such as coatings, lacquer films or adhesive bonds.

Because of the relatively low reactivity of tri-(β-methyl-glycidyl)-isocyanurate at low temperatures, the curing is as a rule carried out at elevated temperature, for example in the temperature range of 40° to 180° C. The curing can optionally also be carried out in two stages, by firstly prematurely stopping the curing temperature, or carrying out the first stage at only a moderately elevated temperature, whereby a curable precondensate which is still fusible and soluble (a so-called "B-stage") is obtained from the tri-(β-methylglycidyl)-isocyanurate and the curing agent component. Such a precondensate can for example be employed for the manufacture of "prepegs," compression moulding compositions and sintering powders. Surprisingly, it proves possible to manufacture "B-stages" which are stable at room temperature from tri-(β-methylglycidyl)-isocyanurate and aliphatic polyamines by warming the mixture of the components to only moderately elevated temperatures of for example about 40° C. In the case of the epoxide resins hitherto known such stable mixtures or "B-stages" could only be manufactured with the less reactive cycloaliphatic or aromatic polyamines.

If desired, active diluents, such as for example styrene oxide, butyl-glycidyl-ether, isooctyl-glycidyl-ether, phenylglycidyl-ether, cresyl-glycidyl-ether, glycidyl esters of synthetic, highly branched, mainly tertiary aliphatic monocarboxylic acids ("CARDURA E"), or cycloaliphatic monoepoxides such as 3-vinyl-2,4-dioxaspiro(5.5)-9,10-epoxy-undecane can be added to the β-methylglycidyl-isocyanurates according to the invention in order to lower the viscosity.

The β-methylglycidyl-isocyanurates according to the invention can furthermore be used mixed with other curable diepoxide or polyepoxide compounds. As such there may for example be mentioned: polyglycidyl ethers of polyhydric alcohols, such as 1,4-butanediol, polyethylene glycols, polypropylene glycols or 2,2-bis-(4'-hydroxycyclohexyl)-propane; polyglycidyl ethers of polyhydric phenols, such as 2,2-bis-(4'-hydroxyphenyl)-propane (=diomethane), 2,2-bis-(4'-hydroxy-3', 5'-dibromophenyl)-propane, bis-(4-hydroxyphenyl)-sulphone, 1,1,2,2-tetrakis-(4-hydroxyphenyl)-ethane or condensation products, manufactured in an acid medium, of formaldehyde with phenols, such as phenol novolacs or cresol novolacs; polyglycidyl esters of polycarboxylic acids, such as for example phthalic acid diglycidyl ester, tetrahydrophthalic acid diglycidyl ester or hexahydrophthalic acid diglycidyl ester; triglycidyl-isocyanurate, N,N'-diglycidyl-5,5-dimethylhydantoin, aminopolyepoxides, such as are obtained by dehydrohalogenation of the reaction products of epihalogenohydrin and primary or secondary amines, such as aniline or 4,4'-diaminodiphenylmethane; further, alicyclic compounds containing several epoxide groups, such as vinylcyclohexene diepoxide, dicyclopentadiene diepoxide, ethylene glycol-bis-(3,4-epoxytetrahydrodicyclopentadien-8-yl)-ether, bis-(3,4-epoxycyclohexylmethyl)-adipate, (3',4'-epoxycyclohexylmethyl)-3,4-epoxycyclohexanecarboxylate, (3',4'6'-methylcyclohexylmethyl)- 3,4-epoxy-6-methylcyclohexanecarboxylate, bis-(cyclopentyl)-ether diepoxide or 3-(3',4'-epoxycyclohexyl)-2,4-dioxaspiro-(5.5)-9,10-epoxy-undecane.

A further subject of the present invention are therefore also curable compositions which are suitable for the manufacture of mouldings, including two-dimensional structures, and which essentially either consist of a mixture of (a) β-methylglycidyl-isocyanurates according to the invention, of formula (I), optionally together with other diepoxide or poly-epoxide compounds, and, further, (b) curing agents for epoxide resins, such as polyamines or polycarboxylic acid anhydrides, or of a still curable, soluble and fusible, precondensate ("B-stage") of components (a) and (b).

As extenders, reinforcing agents, fillers and pigments which can be employed in the curable mixtures according to the invention there may for example be mentioned: coal tar, bitumen, textile fibers, glass fibers, asbestos fibers, boron fibers, carbon fibers, cellulose, polyethylene powder, polypropylene powder; quartz powder; mineral silicates, such as mica, asbestos powder, slate powder; kaolin, aluminum oxide trihydrate, chalk powder, gypsum, antimony trioxide, bentones, silica aerogel ("AEROSIL"), lithopone, baryte, titanium dioxide, carbon black, graphite, oxide pigments such as iron oxide, or metal powders, such as aluminum powder or iron powder.

Suitable organic solvents for the modification of the curable mixtures are for example toluene, xylene, *n*-propanol, butyl acetate, acetone, methyl ethyl ketone, diacetone alcohol, ethylene glycol monomethyl ether, monoethyl ether and monobutyl ether.

As plasticizers, dibutyl, dioctyl and dinonyl phthalate, tricresyl phosphate, trixylenyl phosphate, and also polypropylene glycols can for example be used for modifying the curable mixtures.

Silicones, cellulose acetobutyrate, polyvinyl butyral, waxes, stearates and the like (which can in part also be employed as mould release agents) can be added as flow control agents when employing the curable mixtures, especially in surface protection.

Especially for use in the lacquer field, the β-methylglycidyl-isocyanurates can furthermore be partially esterified in a known manner with carboxylic acids, such as especially higher unsaturated fatty acids. It is furthermore possible to add other curable synthetic resins, for example phenoplasts or aminoplasts, to such lacquer resin formulations.

The curable compositions can be manufactured in the usual manner with the aid of known mixing equipment (stirrers, kneaders, rolls and the like).

The curable compositions according to the invention are above all employed in the fields of surface protection, the electrical industry, laminating processes and the building industry. They can be employed in a formulation suited in each case to the special end use, in the unfilled or filled state, optionally in the form of solutions or emulsions, as paints, lacquers, as compression moulding compositions, dipping resins, casting resins, injection moulding formulations, impregnating resins and adhesives, as tool resins, laminating resins, sealing and filling compositions, floor covering compositions and binders for mineral aggregates.

The main field of use is in the field of casting resins, binders, compression moulding powders and sintering powders. Here the epoxide resin powder mixtures can be processed with or without pressure, according to known processes such as fluidized bed coating, electrostatic fluidized bed coating, spraying, electrostatic spraying, pressing and the like.

In the examples which follow parts denote parts by weight and percentages denote percentages by weight, unless otherwise stated. The relationship of parts by volume to parts by weight is as of the milliliter to the gram.

MANUFACTURING EXAMPLES

EXAMPLE 1

A mixture of 116.1 g. of cyanuric acid (2.7 acid equivalents), 0.7 g. of tetramethylammonium chloride (catalyst) and 2,874 g. of β-methyl-epichlorhydrin is stirred and heated for 5 hours under reflux. After 3 hours a further 0.5 g. of the catalyst were added. In the course of this the boiling point of the reaction mixture rises from initially 120° C. to 125.5° C. The β-methyl-epichlorhydrin adds to the –NH– groups with the formation firstly of N-β-methylchlorhydrin groups and then N-β-methylglycidyl groups. The formation of N-β-methylglycidyl groups during the reaction is followed with the aid of samples, in which the epoxide content is in each case determined by titration after distilling off the unreacted β-methyl-epichlorhydrin. In this way the following are found:

after 69 minutes: 0.76 epoxide equivalents/kg.
after 122 minutes: 1.26 epoxide equivalents/kg.
after 277 minutes: 5.23 epoxide equivalents/kg.
after 307 minutes: 5.98 epoxide equivalents/kg.

After the last-mentioned reaction time, the mixture is cooled to 60° C. and 133.6 g. of 97 percent strength finely powdered sodium hydroxide (3.24 mols) are added in small portions over the course of 40 minutes, with vigorous stirring; at the same time the temperature is kept at 60° C. by slight cooling. Thereafter the water produced in the reaction, together with β-methyl-epichlorhydrin, is azeotropically distilled off under a slight vacuum (120–80 mm. Hg) at 60° C. over the course of 50 minutes.

The mixture is cooled to room temperature and the sodium chloride formed in the reaction is filtered off. The clear yellow filtrate is concentrated at 60° C./20 mm. Hg and then kept at 60° C. under 0.1 mm. Hg, in order to remove the last volatile constituents, until constant weight is reached. The product, which crystallizes gradually, is poured out onto a metal sheet.

Two hundred and sixty-six g. of crude tri-(β-methyl-glycidyl)-isocyanurate (88 percent of theory) are obtained; the product has an epoxide content of 7.91 epoxide equivalents/kg. (89.5 percent of theory) and a chlorine content of 1.65 percent.

For purification, 250 g. of the crude product are recrystallized from 250 g. of ethanol. One-hundred eighty-six and one-tenth g. of pure dry product are obtained in the form of a white crystal powder. The tri-(β-methylglycidyl)-isocyanurate of formula

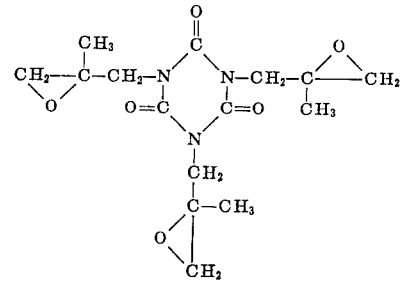

purified in this way has an epoxide content of 8.41 epoxide equivalents/kg. (95.2 percent of theory) and melts at 89.5° to 92.0° C. Elementary analysis shows:

| Found: | Calculated: |
| --- | --- |
| 53.29% C | 53.09% C |
| 6.48% H | 6.24% H |
| 28.19% O | 28.29% O |
| 12.35% N | 12.38% N |

A further 7 g. of tri-(β-methylglycidyl)-isocyanurate can be obtained from the mother liquors.

EXAMPLE 2

A mixture of 90.4 g. of cyanuric acid(0.7 mol), 0.7 g. of tetramethylammonium chloride and 2,236 g. of β-methyl-epichlor-hydrin (21 mols) is stirred for 5½ hours at reflux temperature. In the course of this the boiling point of the mixture rises from 120° to 125° C. After 3 hours a further 0.5 g. of tetramethylammonium chloride were added. The progress of the reaction is followed with the aid of samples, as in example 1. In this way the following are found:

after 80 minutes: 0.74 epoxide equivalents/kg.
after 275 minutes: 5.75 epoxide equivalents/kg.
after 305 minutes: 5.81 epoxide equivalents/kg.

The mixture is now cooled to 60° C. and 202 g. of 50 percent strength aqueous sodium hydroxide solution (2.52 mols) are slowly added dropwise over the course of 2 hours, with vigorous stirring; at the same time the water present in the reaction mixture is continuously removed by azeotropic circulatory distillation over the course of 50 minutes at 60° C. The reaction mixture is then cooled to room temperature and worked up in accordance with example 1.

One-hundred eighty-nine and four-tenths g. of crude tri-(β-methylglycidyl)-isocyanurate (79.8 percent of theory) are obtained, having an epoxide content of 7.75 epoxide equivalents/kg. (corresponding to 87.7 percent of theory).

After recrystallization of the crude product from ethanol according to example 1, 130 g. of a pure product having an epoxide content of 8.49 epoxide equivalents/kg. and melting at 86° to 88° C. are obtained.

EXAMPLE 3

A mixture of 113.6 g. of cyanuric acid, 9.0 g. of tetramethylammonium chloride, 1,411 g. of β-methyl-epichlorhydrin and 1,225 g. of epichlorhydrin is stirred for 2½ hours at reflux temperature. In the course of this the boiling point of the mixture rises from 113° to 118° C. The progress of the reaction is followed with the aid of samples, as in example 1. In this way the following are found:

after 60 minutes: 1.11 epoxide equivalents/kg.
after 150 minutes: 4.32 epoxide equivalents/kg.

The mixture is now cooled to 60° C., and 254 g. of 50 percent strength aqueous sodium hydroxide solution are slowly added dropwise over the course of 2 hours with vigorous stirring; at the same time the water present in the reaction mixture is continuously removed at 60° C. by azeotropic circulatory distillation. The reaction mixture is then cooled to room temperature and worked up in accordance with example 1.

Two-hundred twenty-three and five-tenths g. of crude mixed isocyanurate, having an epoxide content of 9.30 epoxide equivalents/kg., are obtained in the form of a colorless highly viscous resin.

N-NMR measurements permit the conclusion that the product contains about 2 glycidyl groups and one methylglycidyl group group per molecule.

The nuclear magnetic resonance spectrum (60 Mc-NMR) recorded in deuterochloroform shows the following signals, inter alia:

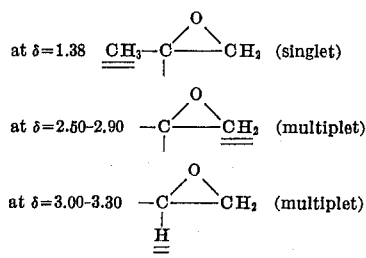

The above-mentioned structures follow from the integration ratio of these signals.

In contrast to triglycidyl-isocyanurate, the new resin is soluble in most epoxide resins, such as diomethane-diglycidylether or diglycidylhydantoin.

USE EXAMPLES

EXAMPLE I

One-hundred twenty-three g. (=1.03 equivalents) of crystalline tris-(β-methylglycidyl)-isocyanurate according to example 1, having an epoxide content of 8.41 epoxide equivalents/kg., are warmed to 110° C. and mixed with 184 g. (=1.0 equivalent) of polysebacic anhydride. Thereafter 1.2 g. of 1-methyl-imidazole are added and the components are well mixed. The mixture is now subjected to a vacuum at 100° C. in order to remove the air bubbles, and is then poured into prewarmed moulds of aluminum alloy (registered trade name "Anticorodal" 140×140×4 mm. or 140×140×3 mm. or 140×140×1 mm. and is subjected to a heat treatment of 16 hours at 140° C. The test specimens for the flexural test (VSM 77,103) and for the impact test (VSM 77,105) were machined from the 4 mm. sheets. The tensile test was carried out according to ISO 527 after punching test specimen No. 2 from the 1 mm. thick sheet. The electrical measurements were carried out on the 3 mm. thick sheet. The mouldings have the following properties:

| | |
|---|---|
| flexural strength (VSM 77,103) | =5.5 kg./mm.² |
| deflection (VSM 77,103) | =>20 mm. |
| impact strength (VSM 77,105) | =>25 cm. kg./cm.² |
| tensile strength (ISO 527) | =150 kg./cm.² |
| elongation at break (ISO 527) | =50% |
| water absorption after 24 hours, 20° C. | =0.3% |
| tracking resistance (VDE 0303) | = level KA 3c |
| arcing resistance (VDE 0303) | = level L 4 |

EXAMPLE II

One-hundred and twenty-three g. (=1.03 equivalents) of crystalline tris-(β-methylglycidyl)-isocyanurate according to example 1, having an epoxide content of 8.41 epoxide equivalents/kg., are warmed to 110° C. until the resin has completely fused. At the same time 58 g. (=1.0 equivalent of active H-atoms bonded to nitrogen) of hexamethylenediamine are fused. The two liquids are cooled slightly and poured together and mixed, so that the mixture has a temperature of 75° C. This mixture is poured into aluminum moulds according to example I, prewarmed to about 40° C., and are subjected to a heat treatment of 16 hours at 80° C. The mouldings manufactured in this way have the following mechanical properties:

| | |
|---|---|
| flexural strength (VSM 77,103) | =7.9 kg./mm.² |
| deflection (VSM 77,103) | =>20 mm. |
| impact strength (VSM 77,105) | =>25 cm. kg./cm.² |

EXAMPLE III

One-hundred sixty g. of crystalline tri-(β-methylglycidyl)-isocyanurate according to example 1, having an epoxide content of 8.41 epoxide equivalents/kg., in the form of a 61.5 percent strength solution in acetone, 38.4 g. of triethylenetetramine, 10 g. of calcium stearate and 593 g. of burnt kaolin (registered trade name "Molochit") are kneaded for about 15 minutes in a twin-bowl kneader, to give a homogeneous mixture. Thereafter the kneaded material is stored for 4 hours in a vacuum cabinet at 40° C. in order to remove the acetone and convert the mass into a condition where it can be ground. After cooling, the dry material is comminuted in a hammer mill. The compression moulding composition thus obtained is uniformly pressed at 165° C. to give test specimens, the following pressing conditions being employed:

| | |
|---|---|
| standard rods according to Martens (DIN 53,458): | 500 kg./cm.², 8 minutes at 165° C. |
| rods for measuring the flexural strength: 77,103) | 500 kg./cm.², 4 minutes at 165° C. |
| sheets for measuring the tracking resistance (VDE 0303): | 350 kg./cm.², 3½ minutes at 165° C. |
| sheets for measuring the loss factor δ, dielectric constant ε, surface resistance and volume resistance: | 350 kg./cm.², 3 minutes at 165° C. |

The following properties of the test specimens were measured:

| | |
|---|---|
| heat distortion point according to Martens (DIN 53,458) | 120° C. |
| flexural strength (VSM 77,103) | 7.2 kg./mm.² |
| dielectric loss factor tg δ (23° C., 50 Hz.) | 1.74×10⁻² |
| dielectric constant ε (23° C., 50 Hz.) | 5.9 |
| surface resistance, dry (23° C.) | 1.6×10¹⁴ Ohm |
| volume resistance, dry (23° C.) | 3.6×10¹⁴ Ohm × cm. |
| tracking resistance (VDE 0303) | level KA 3c |

We claim:
1. A β-methylglycidyl-isocyanurate of formula

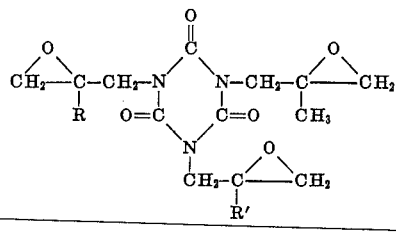

wherein R and R' each represents a member selected from the group consisting of a hydrogen atom and a methyl group.

2. Tri-(β-methylglycidyl)-isocyanurate of formula

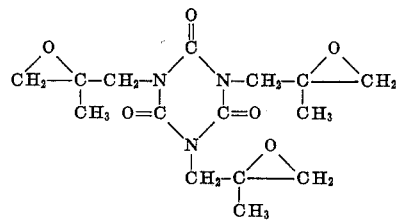

3. A curable composition of matter which comprises (a) a β-methylglycidyl-isocyanurate of formula

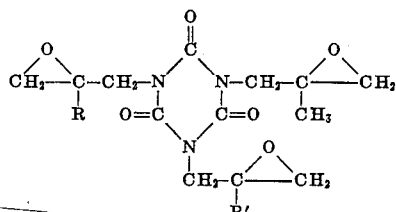

wherein R and R' each represents a member selected from the group consisting of a hydrogen atom and a methyl group and (b) a curing agent for epoxide resins or a still curable, soluble and fusible precondensate ("B-stage") of components (a) and (b).

* * * * *